United States Patent
Satou et al.

(10) Patent No.: US 8,499,885 B1
(45) Date of Patent: Aug. 6, 2013

(54) MOTOR DRIVE APPARATUS

(71) Applicant: Denso Corporation, Kariya (JP)

(72) Inventors: Takafumi Satou, Okazaki (JP); Jiro Hayashi, Ama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/766,812

(22) Filed: Feb. 14, 2013

(30) Foreign Application Priority Data

Feb. 29, 2012 (JP) .................................... 2012-43429

(51) Int. Cl.
*B62D 5/04* (2006.01)

(52) U.S. Cl.
USPC ........... 180/446; 180/443; 180/444; 318/434; 701/41

(58) Field of Classification Search
USPC ...................... 180/443, 444, 446; 701/41, 42; 318/433, 434
See application file for complete search history.

(56) References Cited

U.S. PATENT DOCUMENTS

| | | | | |
|---|---|---|---|---|
| 7,942,232 B2* | 5/2011 | Matsuda et al. | ............... | 180/443 |
| 8,169,174 B2* | 5/2012 | Shibata | .......................... | 318/434 |
| 2009/0066286 A1* | 3/2009 | Gunji | ........................... | 318/490 |
| 2011/0043152 A1 | 2/2011 | Kidokoro et al. | | |

FOREIGN PATENT DOCUMENTS

JP  2009-261067  11/2009

* cited by examiner

*Primary Examiner* — Kevin Hurley
*Assistant Examiner* — Marc A Scharich
(74) *Attorney, Agent, or Firm* — Nixon & Vanderhye PC (57) ABSTRACT

A power transducer failure detection device detects a failure on a power transducer, making a power transducer control device stop driving the power transducer. A first switching control device turns off a first power supply relay of a power supply source switching device and turns on a second power supply relay of the power supply source switching device. While the power transducer stops driving, a motor may rotate due to an external force to generate a regenerative voltage. The regenerative voltage is then regenerated in a battery through a route from the power transducer via the second power supply relay being turned on and a parasitic diode of the first power supply relay. This can protect elements such as switching elements and a smoothing capacitor of the power transducer against a regenerative voltage and prevent the elements from being destroyed or reducing the useful life due to overvoltage.

9 Claims, 4 Drawing Sheets

MOTOR DRIVE APPARATUS

CROSS REFERENCE TO RELATED APPLICATION

The present application is based on Japanese Patent Application No. 2012-43429 filed on Feb. 29, 2012, the disclosure of which is incorporated herein by reference.

TECHNICAL FIELD

The present disclosure relates to a motor drive apparatus, which drives a motor, and an electric power steering apparatus.

BACKGROUND ART

[Patent document 1] JP-2011-045212A (US 2011/0043152 A)

Conventionally, there is known a motor drive apparatus provided with a power transducer that includes more than one semiconductor switching element. An example motor drive apparatus converts DC power from a power supply source into three-phase AC power to drive a three-phase AC motor.

According to the motor drive apparatus disclosed in patent document 1, a power line connecting the power transducer with the motor is provided with a cutoff switch that disconnects the power transducer from the motor. If the semiconductor switching element of the power transducer fails due to short-circuiting, the apparatus operates the cutoff switch (i.e., turns off the cutoff switch) to prevent the motor from entering the brake state.

Generally, the motor works as a power generator and generates a regenerative voltage if an external force rotates the rotary shaft. Basically, the power supply source and the power transducer are connected if the power transducer of the motor drive apparatus is normally driven. The regenerative voltage can be transferred to the power supply source. An external force may often rotate the rotary shaft on an electric power steering apparatus if a tire drives over an obstacle while the vehicle is running, for example. Generally, the motor drive apparatus is controlled to suppress a regenerative voltage if the motor drive apparatus is used under a condition that may often generate a regenerative voltage.

However, for example, the semiconductor switching element included in the power transducer may be short-circuited. In such a case, some motor drive apparatus turns off a switch provided between the power supply source and the power transducer to stop driving the power transducer. Such a motor drive apparatus cannot transfer a regenerative voltage to the power supply source if the regenerative voltage is generated while the power transducer stops. For example, the electric power steering apparatus cannot transfer the generated regenerative voltage to the power supply source if the power transducer fails and a tire drives over an obstacle while the vehicle is running. The motor drive apparatus cannot provide control to suppress the regenerative voltage because the power transducer stops.

There may be a motor drive apparatus that turns off the switch provided between the power supply source and the power transducer when the ignition switch is turned off. Suppose that the steering system is operated to generate a regenerative voltage while the ignition switch is turned off and the vehicle is raised using a jack, for example. The motor drive apparatus cannot transfer the generated regenerative voltage to the power supply source. The motor drive apparatus cannot provide control to suppress the regenerative voltage.

As a result, the regenerative voltage may destroy the semiconductor switching element of the power transducer. An overvoltage due to the regenerative voltage may decrease the life of a smoothing capacitor that smoothes the energy from the power supply source.

The motor drive apparatus according to patent document 1 turns off the cutoff switch between the power transducer and the motor if a short-circuiting failure occurs inside the power transducer. If the cutoff switch fails due to short-circuiting, the motor drive apparatus is equivalent to having no cutoff switch. It is impossible to protect elements such as the semiconductor switching element and the smoothing capacitor of the power transducer against a regenerative voltage.

SUMMARY

The present disclosure has been made in consideration of the foregoing. It is, therefore, an object of the present disclosure to provide a motor drive apparatus, which protects a semiconductor switching element of a power transducer against a regenerative voltage generated from a motor rotated due to external force, and an electric power steering apparatus including the motor drive apparatus.

To achieve the above object, according to a first example of the present disclosure, a motor drive apparatus is provided to include a current instruction device, a power transducer, a power supply source switching device, a power transducer failure detection device, a power transducer control device, and a first switching control device. The current instruction device issues a current instruction value to drive a motor having a plurality of phases. The power transducer includes a plurality of semiconductor switching elements, converts power supplied from a power supply source, and outputs the power to the motor. The power supply source switching device is provided between the power supply source and the power transducer and performs one of electrical connection and disconnection between the power supply source and the power transducer. The power transducer failure detection device detects a failure on the power transducer. The power transducer control device controls driving of the power transducer according to the current instruction value and stops driving the power transducer when the power transducer failure detection device detects a failure on the power transducer. The first switching control device controls the power supply source switching device and enables the power supply source switching device to enter a regenerative conduction state when driving of the power transducer stops, wherein the regenerative conduction state enables conduction of a regenerative current from the power transducer to the power supply source.

While the power transducer stops driving, the motor may rotate due to external force to generate a regenerative voltage. In such a case, a first switching control device allows a power supply source switching device to enter a regenerative conduction state. The regenerative voltage can be transferred to a power supply source. For example, the power transducer may fail and a tire may drive over an obstacle while the vehicle is running. In such a case, the electric power steering apparatus can transfer a generated regenerative voltage to the power supply source.

Therefore, it is possible to protect elements such as a switching element and a smoothing capacitor of the power transducer against a regenerative voltage and prevent the elements from being destroyed or reducing the useful life due to overvoltage.

According to a second example of the present disclosure, an electric power steering apparatus is provided to include the motor drive apparatus according to the first example, a motor, and a power transmission device. The motor is driven by the motor drive apparatus and generates steering assist torque to supplement a steering force of a driver. The power transmission device transmits rotation of the motor to a steering shaft.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiments of using a motor drive apparatus according to the present disclosure for an electric power steering apparatus of a vehicle will be described in further detail with reference to the accompanying drawings.

First Embodiment

A motor drive apparatus according to a first embodiment of the present disclosure will be described with reference to FIGS. 1 and 2.

Figure 2:
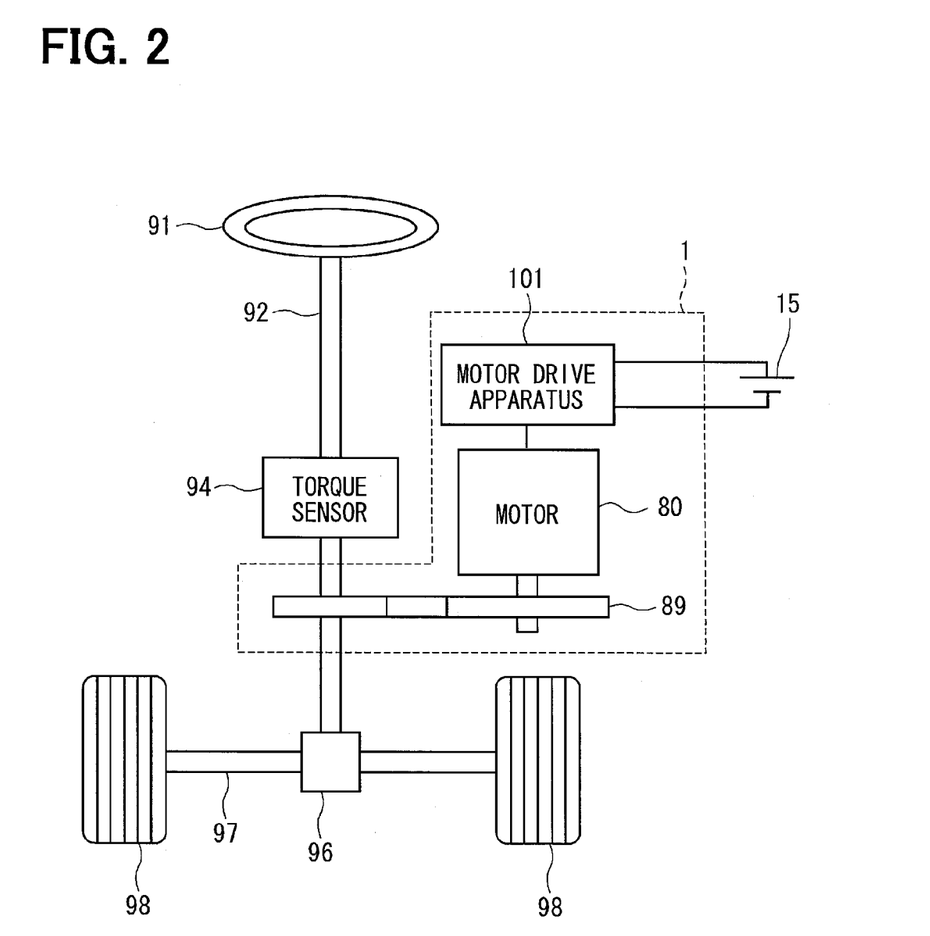
FIG. 2 is a configuration diagram illustrating an electric power steering apparatus using the motor drive apparatus according to the first embodiment of the present disclosure.

As illustrated in FIG. 2, an electric power steering apparatus 1 provides a steering shaft 92 with steering assist torque to assist a driver in his or her steering torque.

The steering shaft 92 is connected to a steering wheel 91 and is provided with a torque sensor 94 to detect the steering torque. A pinion gear 96 is provided at the tip of the steering shaft 92 and engages with a rack shaft 97. A pair of wheels 98 is rotatably connected to both ends of the rack shaft 97 via a tie rod, for example. The pinion gear 96 converts rotary movement of the steering shaft 92 into linear movement for the rack shaft 97. The pair of wheels 98 is steered based on an angle corresponding to a change in the linear movement of the rack shaft 97.

The electric power steering apparatus 1 includes a motor 80, a reduction gear 89, and a motor drive apparatus 101. The motor 80 functions as a steering assist motor that generates steering assist torque. The reduction gear 89 is provided as a power transmission device or means 89 that reduces rotation output from the motor 80 and transmits the rotation output to the steering shaft 92. The motor drive apparatus 101 drives the motor 80. The motor 80 according to the embodiment is provided as a three-phase AC brushless motor.

The motor drive apparatus 101 converts the electric power supplied from a battery 15 provided as the power supply source and drives the motor 80. According to the embodiment, the regenerative voltage generated from the motor 80 is regenerated for the battery 15. For this purpose, the battery 15 is preferred to have the large capacitor capacity and hardly increase the voltage during regenerated operation.

Figure 1:
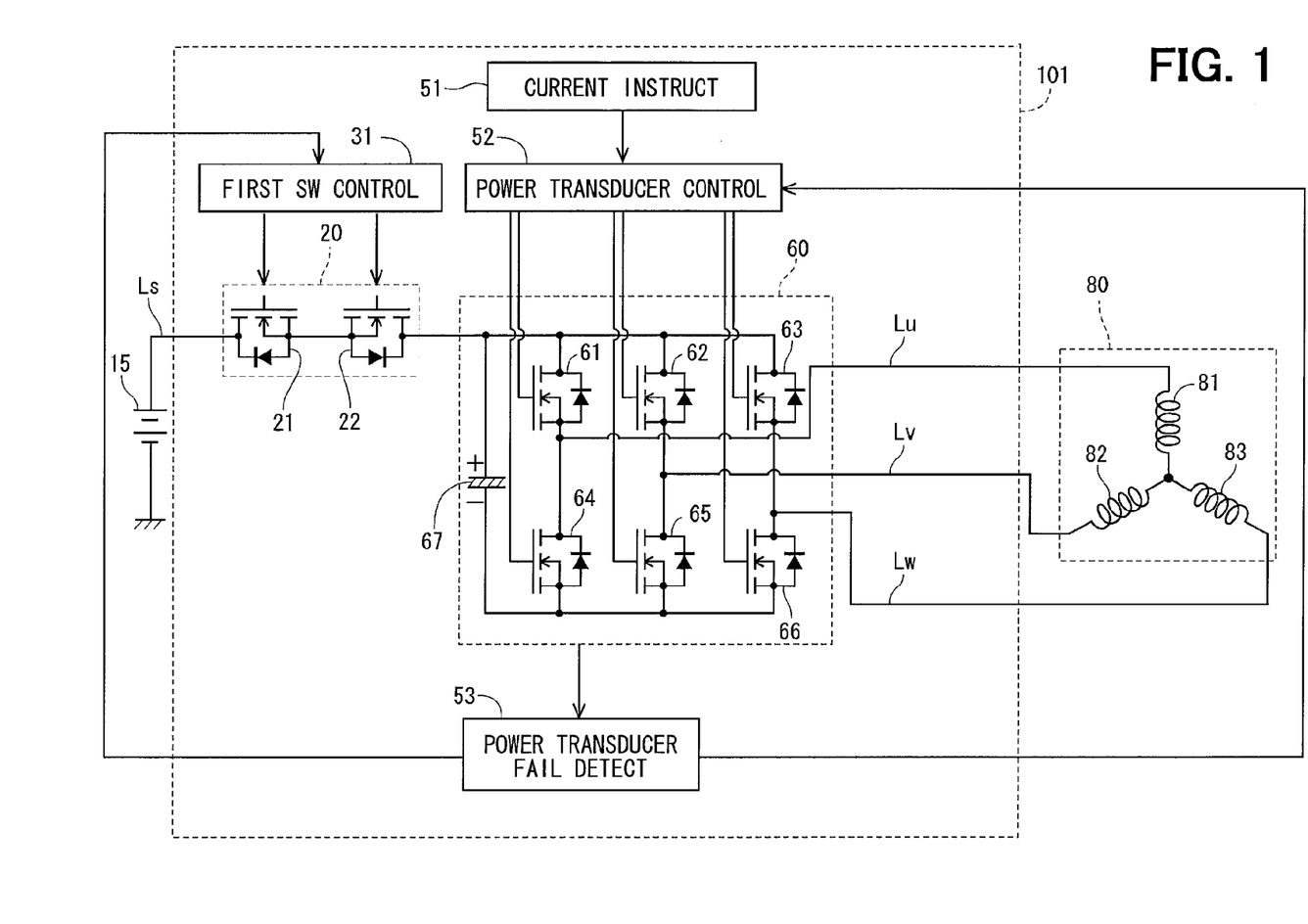
FIG. 1 is a configuration diagram illustrating a motor drive apparatus according to a first embodiment of the present disclosure.

As illustrated in FIG. 1, the motor drive apparatus 101 includes a power transducer 60 as a major component. The power transducer 60 converts the power and outputs it to the motor 80. A power supply source switching device or means 20 is provided between the power transducer 60 and the battery 15. The motor drive apparatus 101 includes a first switching control device or means 31, a current instruction device or means 51, a power transducer control device or means 52, and a power transducer failure detection device or means 53 as a control portion. Specifically, these devices or means of the control portion are configured as a microcomputer or a pre-driver.

The power supply source switching device 20 is provided for a high-potential line Ls between the battery 15 and the power transducer 60. The power supply source switching device 20 electrically connects or disconnects the battery 15 from the power transducer 60. According to the embodiment, the power supply source switching device 20 includes one first power supply relay 21 and one second power supply relay 22 that are connected in series.

The first power supply relay 21 is provided as a first switch. The second power supply relay 22 is provided as a second switch. The first power supply relay 21 and the second power supply relay 22 are equivalent to semiconductor switching elements provided with parasitic diodes. The parasitic diode of the first power supply relay 21 allows flow of a current from the power transducer 60 to the battery 15. The parasitic diode of the second power supply relay 22 allows flow of a current from the battery 15 to the power transducer 60.

The first switching control device 31 is provided in a microcomputer, for example, and controls switching of the first power supply relay 21 and the second power supply relay 22 independently of each other. The first switching control device 31 may be also referred to as a power source side switching control device or means. Specifically, the first switching control device 31 turns on or off both the first power supply relay 21 and the second power supply relay 22. In addition, the first switching control device 31 can turn off the first power supply relay 21 and turn on the second power supply relay 22.

The following description about switching of the semiconductor switching element uses the expression of "turning off," "releasing," or "disconnecting" as the same meaning and the expression of "turning on," "short-circuiting," or "connecting" as the same meaning.

As illustrated in FIG. 1, the battery 15 is connected in a correct direction. Namely, the first power supply relay 21 is connected to the positive electrode of the battery 15. In this case, turning off the first power supply relay 21 stops the battery 15 from supplying the power to the power transducer 60.

Suppose the battery 15 is connected in a direction reverse to that shown in FIG. 1 so that the first power supply relay 21 is connected to the ground side of the battery 15. In this case, the current flows through the parasitic diode of the first power supply relay 21 even when only the first power supply relay 21 is turned off. The battery 15 cannot be disconnected from the power transducer 60. The power supply from the battery 15 to the power transducer 60 can be disabled by turning off the second power supply relay 22 serially connected to the first power supply relay 21.

As described above, the power supply source switching device 20 is configured by serially connecting the power supply relays 21 and 22 having reversely oriented parasitic diodes. Turning off both the first power supply relays 21 and 22 can disable the power supply from the battery 15 to the power transducer 60 regardless of connection directions of the battery 15.

The power transducer 60 according to the embodiment is provided as a three-phase inverter and includes six semiconductor switching elements 61 through 66 connected as a bridge. The semiconductor switching elements 61 through 66 are provided as metal-oxide semiconductor field-effect transistors (MOSFETs), for example.

The drains of the switching elements 61, 62, and 63 for a higher potential are connected to the positive side of the battery 15. The sources of the switching elements 61, 62, and 63 are connected to the drains of the switching elements 64, 65, and 66 for a lower potential. The sources of the switching elements 64, 65, and 66 are connected to the ground via a route (not shown). Connection points between the switching elements 61, 62, and 63 and the switching elements 64, 65, and 66 are connected to one ends of coils 81, 82, and 83 included in the motor 80 via power lines Lu, Lv, and Lw, respectively.

The switching elements 61 through 66 turn on or off according to a switching signal output to the gates from the power transducer control device 52 to control the conduction to the motor 80. The power transducer 60 thereby converts the DC power supplied from the battery 15 into three-phase AC power.

The power transducer 60 is provided with a smoothing capacitor 67 parallel to the bridge circuit. The smoothing capacitor 67 stores an electric charge and smoothes the energy from the battery 15.

The current instruction device 51 supplies a current instruction value to drive the motor 80 based on signals such as a torque signal and a rotation angle signal supplied to the microcomputer.

The power transducer control device 52 includes a pre-driver and controls driving of the power transducer 60 according to a current instruction value from the current instruction device 51.

The power transducer failure detection device 53 is provided in the microcomputer, for example. The power transducer failure detection device 53 detects a failure of the power transducer 60, or more specifically, a short-circuiting failure on the switching elements 61 through 66.

Operations of the motor drive apparatus 101 will be described.

The power transducer failure detection device 53 detects a failure of the power transducer 60 and transmits a failure detection signal to the power transducer control device 52 and the first switching control device 31. The power transducer control device 52 then stops driving the power transducer 60.

The first switching control device 31 turns off the first power supply relay 21 of the power supply source switching device 20 and turns on the second power supply relay 22 thereof. Namely, a regenerative conduction state is enabled to allow a regenerative current to be applied to the battery 15 from the power transducer 60.

While the power transducer 60 stops, the motor 80 may rotate due to an external force to generate a regenerative voltage. A regenerative current then flows from the motor 80 via the parasitic diode of the switching element at the power supply source of the power transducer 60. The smoothing capacitor 67 charges part of the regenerative voltage. An excess regenerative voltage is regenerated in the battery 15 via (i) the second power supply relay 22 that is turned on and (ii) the parasitic diode of the first power supply relay 21.

The motor drive apparatus 101 according to the embodiment can transfer a regenerative voltage generated from the motor 80 to the battery 15. For example, the electric power steering apparatus 1 can transfer the generated regenerative voltage to the battery 15 if the power transducer 60 fails and a tire drives over an obstacle while the vehicle is running.

Therefore, the motor drive apparatus 101 can protect elements such as the switching elements 61 through 66 and the smoothing capacitor 67 of the power transducer 60 against a regenerative voltage and prevent the elements from being destroyed or reducing the useful life due to overvoltage.

The first switching control device 31 can independently control the first power supply relay 21 and the second power supply relay 22 included in the power supply source switching device 20. The first switching control device 31 can turn off the first power supply relay 21 and turn on the second power supply relay 22. Suppose the independent control is unavailable. Then, the first power supply relay 21 and the second power supply relay 22 must be simultaneously turned on in order to turn on the second power supply relay 22 so that the regenerative current can be applied to the battery 15. In this case, a slight current flows from the battery because the circuit is closed even if the power transducer 60 stops being driven. The slight current can be prevented by turning off the first power supply relay 21 and turning on the second power supply relay 22.

Second Embodiment

A motor drive apparatus according to a second embodiment of the present disclosure will be described with reference to FIG. 3. The motor drive apparatus according to the second embodiment includes an additional configuration compared to the first embodiment.

Hereinafter, the mutually corresponding parts in the following embodiment and the previous embodiment are designated by the same reference numerals and a detailed description is omitted for simplicity.

Figure 3:
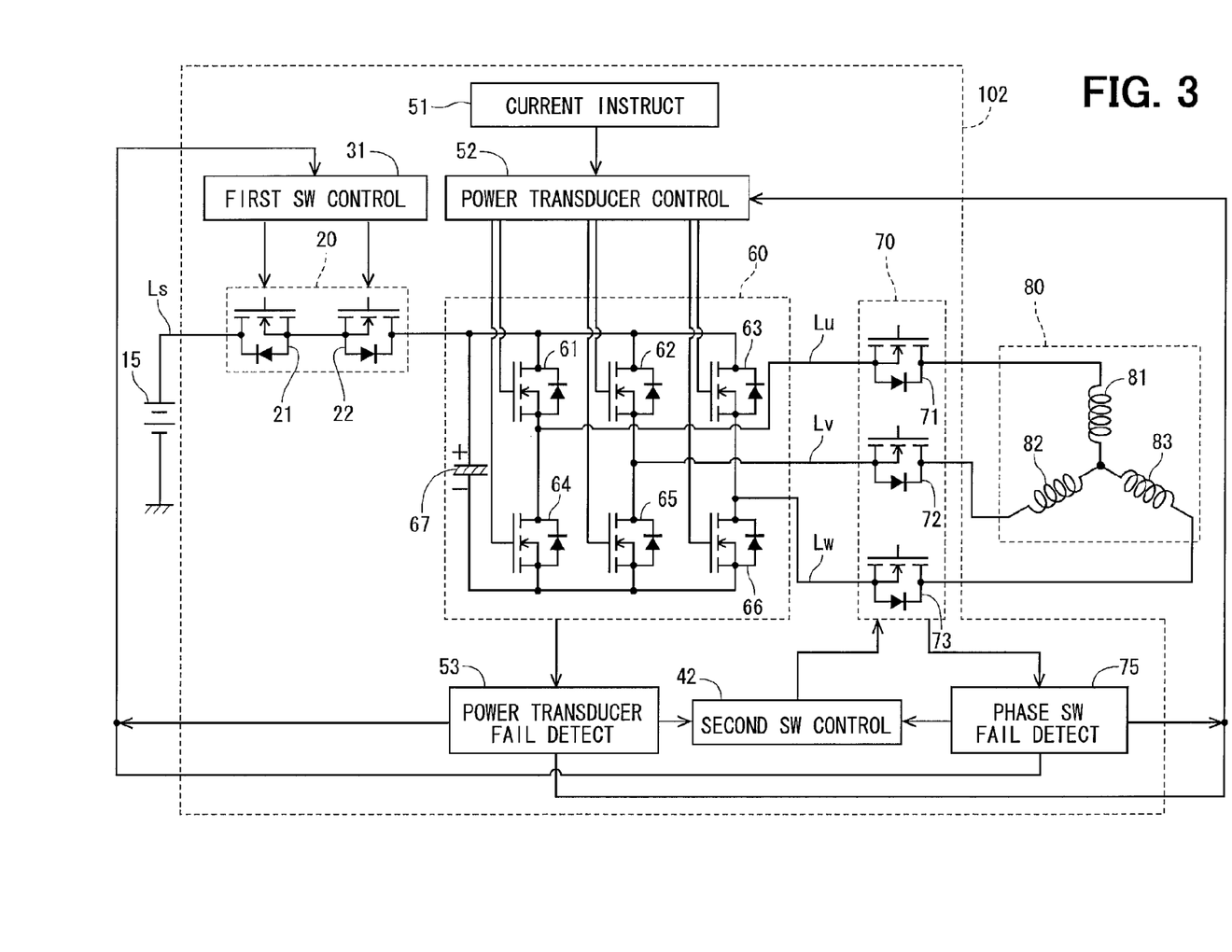
FIG. 3 is a configuration diagram illustrating a motor drive apparatus according to a second embodiment of the present disclosure.

As illustrated in FIG. 3, a motor drive apparatus 102 according to the second embodiment includes motor relays 71, 72, and 73 provided for power lines Lu, Lv, and Lw corresponding to each phase. The motor relays 71, 72, and 73 are equivalent to semiconductor switching elements provided with parasitic diodes similarly to the switching elements 61 through 66 of the power transducer 60 and the power supply relays 21 and 22 of the power supply source switching device 20. The parasitic diodes of the motor relays 71, 72, and 73 can conduct a current flowing in the direction from the power transducer 60 to the motor 80. The motor relays 71, 72, and 73 turn on or off based on a switching signal from a second switching control device or means 42 and configure a phase switching device or means 70.

A phase switching failure detection device or means 75 detects a short-circuiting or disconnection failure on the motor relays 71, 72, and 73 configuring the phase switching device 70. It may be possible to use the failure detection method disclosed in JP-A-2009-261067.

To detect a short-circuiting failure in the phase switching device 70, all the motor relays 71, 72, and 73 are turned off. The switching element at the power supply source of the power transducer 60 is controlled to apply a voltage based on the power supply voltage to a specified phase. Terminal voltages for the two phases other than the specified phase are monitored. To detect a disconnection failure in the phase switching device 70, all the motor relays 71, 72, and 73 are turned on The switching element at the power supply source of the power transducer 60 is controlled to apply a voltage based on the power supply voltage to a specified phase. Terminal voltages for the two phases other than the specified phase are monitored.

The second switching control device 42 is provided in a microcomputer, for example. The second switching control device 42 is provided corresponding to the motor relays 71, 72, and 73 for each phase and controls operation of the corresponding motor relays 71, 72, and 73. The second switching control device 42 may be also referred to as a phase switching control device or means. According to the embodiment, the second switching control device 42 is provided for the three-phase motor relays 71, 72, and 73 in common.

Operation of the motor drive apparatus 102 will be described.

The power transducer failure detection device 53 detects a failure in the power transducer 60. A failure detection signal is transmitted to the power transducer control device 52, the first switching control device 31, and the second switching control device 42. The power transducer control device 52 then stops driving the power transducer 60. The first switching control device 31 turns off the power supply relays 21 and 22 of the power supply source switching device 20. The second switching control device 42 turns off the motor relays 71, 72, and 73 of the phase switching device 70.

Suppose the phase switching device 70 is released normally. The phase switching device 70 blocks a regenerative voltage if generated by rotation of the motor 80 due to an external force. The phase switching device 70 can prevent a regenerative voltage from being applied to the power transducer 60.

The phase switching failure detection device 75 detects a failure in the phase switching device 70. A failure detection signal is transmitted to the power transducer control device 52, the first switching control device 31, and the second switching control device 42.

If a disconnection failure in the phase switching device 70 is detected, the power transducer control device 52 stops driving the power transducer 60. The first switching control device 31 turns off the power supply relays 21 and 22 of the power supply source switching device 20. The second switching control device 42 turns off any of the motor relays 71, 72, and 73 other than the one subject to the disconnection failure. Namely, all the motor relays 71, 72, and 73 including the one subject to the disconnection failure are turned off.

Also in this case, the phase switching device 70 blocks a regenerative voltage if generated by rotation of the motor 80 due to an external force.

If a short-circuiting failure is detected in the phase switching device 70, the first switching control device 31 turns off the first power supply relay 21 of the power supply source switching device 20 and turns on the second power supply relay 22 thereof to enable a regenerative conduction state. The second switching control device 42 turns off the motor relay that belongs to the motor relays 71, 72, and 73 of the phase switching device 70 and is free from the short-circuiting failure.

While the phase switching device 70 is subject to the short-circuit failure, the motor 80 may rotate due to an external force to generate a regenerative voltage. A regenerative current then passes through the power line corresponding to the phase causing the short-circuiting failure on the phase switching device 70 and flows via the parasitic diode of the switching element at the power supply source of the power transducer 60. The smoothing capacitor 67 charges part of the regenerative voltage. An excess regenerative voltage is regenerated in the battery 15 via (i) the second power supply relay 22 that is turned on and (ii) the parasitic diode of the first power supply relay 21.

In addition to the effect of the first embodiment, the second embodiment provides the phase switching device 70 capable of blocking the power lines Lu, Lv, and Lw for the respective phases. Blocking the phase switching device 70 can prevent the motor 80 from entering the brake state if a semiconductor switching element of the power transducer 60 fails due to short-circuiting.

The phase switching failure detection device 75 can detect a short-circuiting or disconnection failure on the phase switching device 70 and locate a failed phase.

The second switching control device 42 is provided in common with the three-phase motor relays 71, 72, and 73. This enables to miniaturize a control circuit and decrease the number of parts and reduce the manufacturing cost.

Third Embodiment

A motor drive apparatus according to a third embodiment will be described with reference to FIG. 4. The motor drive apparatus according to the third embodiment differs from that according to the second embodiment in part of the functions of the first switching control device and the second switching control device.

Figure 4:
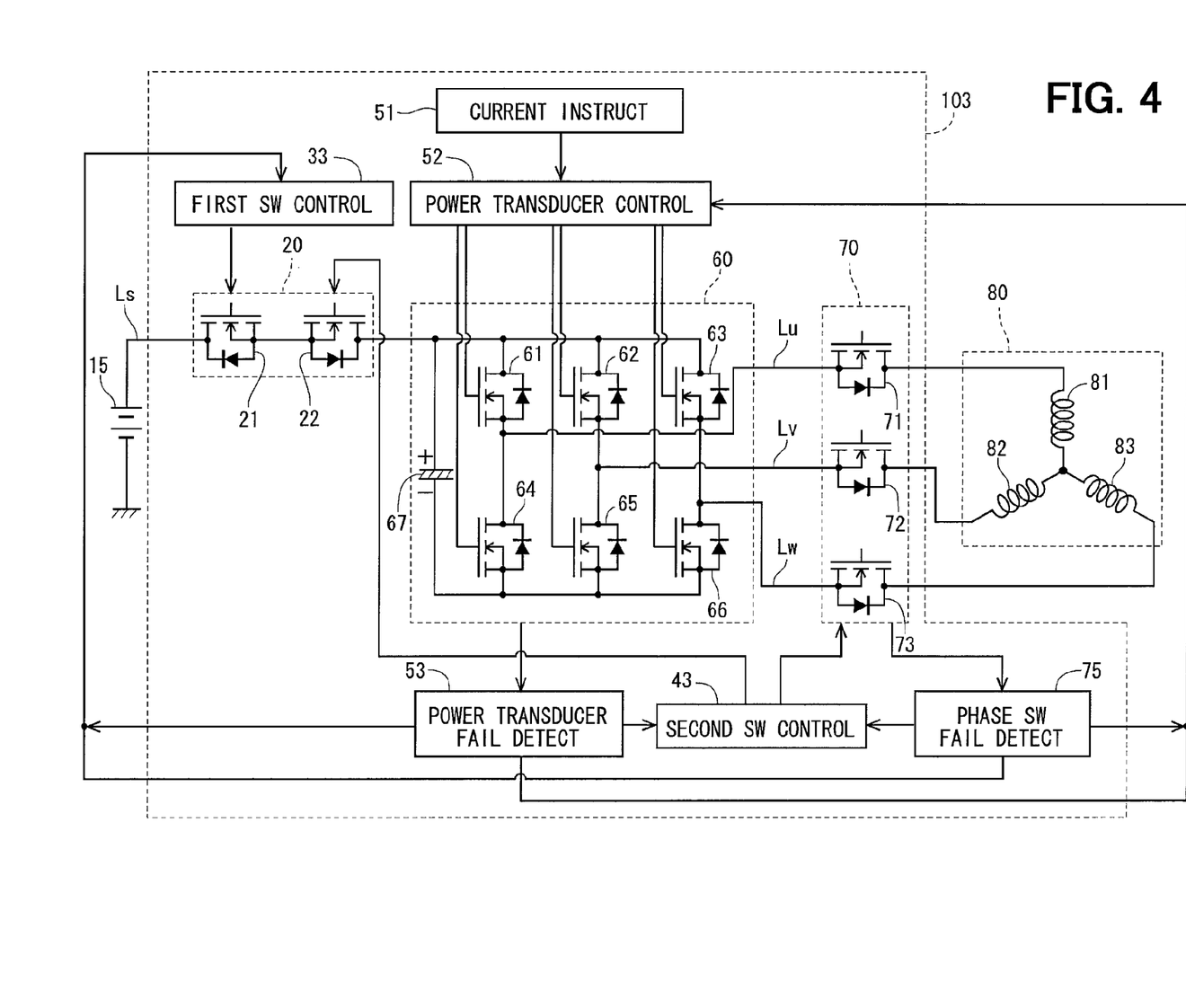
FIG. 4 is a configuration diagram illustrating a motor drive apparatus according to a third embodiment of the present disclosure.

As illustrated in FIG. 4, a motor drive apparatus 103 according to the third embodiment includes a first switching control device or means 33 and a second switching control device or means 43 in place of the first switching control device 31 and the second switching control device 42.

The first switching control device 33 controls only the first power supply relay 21 in the power supply source switching device 20. The second switching control device 43 controls the second power supply relay 22 alone in the power supply source switching device 20 as well as the motor relays 71, 72, and 73 of the phase switching device 70 in common. In other words, the second switching control device 43 controls the second power supply relay 22 and the motor relays 71, 72, and 73 in common.

Operation of the motor drive apparatus 103 will be described.

The motor drive apparatus 103 operates similarly to the second embodiment if the power transducer failure detection device 53 detects a failure on the power transducer 60 and the phase switching failure detection device 75 detects a disconnection failure on the phase switching device 70.

The phase switching failure detection device 75 may detect a short-circuit failure on the phase switching device 70. In this case, the first switching control device 33 turns off the first power supply relay 21 of the power supply source switching device 20. The second switching control device 43 turns on the second power supply relay 22 and turns on the motor relay, which belongs to the motor relays 71, 72, and 73 of the phase switching device 70 and is free from the short-circuit failure. The power supply source switching device 20 thereby enters the regenerative conduction state.

While the phase switching device 70 is subject to a short-circuiting failure, the motor 80 may rotate due to an external force to generate a regenerative voltage. A regenerative current passes through the power line corresponding to the phase causing the short-circuiting failure on the phase switching device 70 and flows via the parasitic diode of the switching element at the power supply source of the power transducer 60. Part of the regenerative voltage is charged in the smoothing capacitor 67. An excess regenerative voltage is regenerated on the battery 15 via the second power supply relay 22 that is turned on and the parasitic diode of the first power supply relay 21.

In addition to the effects of the first and second embodiments, the third embodiment allows the second switching control device 43 to control the second power supply relay 22 as well as the motor relays 71, 72, and 73 in common. This enables to miniaturize the control circuit and decrease the number of parts and reduce the manufacturing cost.

Other Embodiments (a) According to the above-mentioned embodiments, the power supply source switching device includes the first power supply relay 21 and the second power supply relay 22 each one connected in series. It may be also favorable to connect more than one first power supply relay 21 and/or more than one second power supply relay 22 in series.

The power supply source switching device may include only the first power supply relay 21. While the first power supply relay 21 is turned off, a regenerative current, if generated, can flow from the power transducer to the power supply source via the parasitic diode.

(b) Only the motor relays 71, 72, and 73 as the phase switching device may be added to the first embodiment. The phase switching failure detection device 75 and the second switching control device 42 may be omissible. The configuration can be simplified if the motor relays 71, 72, and 73 ensure high specification enough to hardly cause a failure, for example.

(c) The semiconductor switching element may be provided as a field-effect transistor other than MOSFET or an IGBT (insulated gate bipolar transistor).

(d) The motor is not limited to three phases but may use four or more phases.

(e) The motor drive apparatus according to the present disclosure may be applicable to other motors than the steering assist motor of the electric power steering apparatus.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor drive apparatus comprising:
a current instruction device that issues a current instruction value to drive a motor having a plurality of phases;
a power transducer that includes a plurality of semiconductor switching elements, the power transducer converting power supplied from a power supply source and outputting the power to the motor;
a power supply source switching device that is provided between the power supply source and the power transducer and performs one of electrical connection and disconnection between the power supply source and the power transducer;
a power transducer failure detection device that detects a failure on the power transducer;
a power transducer control device that controls driving of the power transducer according to the current instruction value and stops driving the power transducer when the power transducer failure detection device detects a failure on the power transducer; and
a first switching control device that controls the power supply source switching device to make the power supply source switching device enter a regenerative conduction state when driving of the power transducer stops, the regenerative conduction state permitting conduction of a regenerative current from the power transducer to the power supply source.

2. The motor drive apparatus according to claim 1, comprising:
a phase switching device that is provided between the power transducer and the motor for each phase, the phase switching device electrically connecting or disconnecting the power transducer and the motor for each phase.

3. The motor drive apparatus according to claim 2, comprising:
a phase switching failure detection device that detects a failure on the phase switching device.

4. The motor drive apparatus according to claim 3, comprising:
a second switching control device that is provided correspondingly to the phase switching device for each phase and controls the corresponding phase switching device.

5. The motor drive apparatus according to claim 4,
wherein the second switching control device is provided in common with the phase switching device for all phases.

6. The motor drive apparatus according to claim 1,
wherein the power supply source switching device includes at least one first switch and at least one second switch connected in series;
the first switch being a semiconductor switching element attached with a parasitic diode to conduct a current in a direction from the power transducer to the power supply source,
the second switch being a semiconductor switching element attached with a parasitic diode to conduct a current in a direction from the power supply source to the power transducer.

7. The motor drive apparatus according to claim 6,
wherein the first switching control device independently controls the first switch and the second switch, the first switching control device turning off the first switch and turning on the second switch when driving of the power transducer stops.

8. The motor drive apparatus according to claim 7, comprising:
a phase switching device that is provided between the power transducer and the motor for each phase and performs one of operations of electrically connecting and disconnecting the power transducer and the motor for each phase;
a phase switching failure detection device that detects a failure on the phase switching device; and
a second switching control device that is provided in common with the phase switching device for all phases and controls the phase switching device,
the second switching control device further controlling the second switch, which is one of control targets of the first switching control device, by replacing the first switching control device.

9. An electric power steering apparatus comprising:
the motor drive apparatus according to claim 1;
a motor that is driven by the motor drive apparatus and generates steering assist torque to supplement a steering force of a driver; and a power transmission device that transmits rotation of the motor to a steering shaft.

* * * * *